(12) United States Patent
Dean

(10) Patent No.: US 9,634,347 B2
(45) Date of Patent: Apr. 25, 2017

(54) METHOD AND COMPONENTS FOR REPAIRING A CERAMIC FUEL CELL STACK ASSEMBLY

(71) Applicant: LG Fuel Cell Systems Inc., North Canton, OH (US)

(72) Inventor: Eric Dean, Mickleover (GB)

(73) Assignee: LG Fuel Cell Systems Inc., North Canton, OH (US)

( * ) Notice: Subject to any disclaimer, the term of this patent is extended or adjusted under 35 U.S.C. 154(b) by 89 days.

(21) Appl. No.: 14/801,663

(22) Filed: Jul. 16, 2015

(65) Prior Publication Data

US 2016/0141707 A1  May 19, 2016

(30) Foreign Application Priority Data

Nov. 17, 2014  (GB) .................................. 1420378.0

(51) Int. Cl.
*H01M 2/38* (2006.01)
*H01M 8/2485* (2016.01)
(Continued)

(52) U.S. Cl.
CPC ..... *H01M 8/2485* (2013.01); *H01M 8/04089* (2013.01); *H01M 8/12* (2013.01);
(Continued)

(58) Field of Classification Search
CPC . H01M 2008/1293; H01M 2300/0074; H01M 8/04089; H01M 8/12; H01M 8/2415; H01M 8/2425; H01M 8/2485
See application file for complete search history.

(56) References Cited

U.S. PATENT DOCUMENTS

| | | | |
|---|---|---|---|
| 4,623,596 A | 11/1986 | Kamoshita | |
| 5,543,240 A | 8/1996 | Lee et al. | |
| 6,677,069 B1 * | 1/2004 | Piascik | H01M 8/2415 |
| | | | 427/115 |

FOREIGN PATENT DOCUMENTS

| | | |
|---|---|---|
| DE | 102013010314 A1 | 3/2014 |
| EP | 0668622 B1 | 4/1998 |

(Continued)

OTHER PUBLICATIONS

Faidel et al., "Laser-Based Glass Sealant Repair Application for Untight Solid Oxide Fuel Cell Stacks," Journal of the University of Chemical Technology and Metallurgy, 47, 4, Jan. 1, 2012, pp. 421-428, XP055239987.

(Continued)

*Primary Examiner* — Patrick Ryan
*Assistant Examiner* — Ben Lewis
(74) *Attorney, Agent, or Firm* — Shumaker & Sieffert, P.A.

(57) ABSTRACT

There is disclosed a method and components for repairing a fuel cell stack. In particular, the method and components relate to repairing a high temperature fuel cell stack incorporating ceramic components. The method includes identifying a fuel cell bundle within a fuel cell strip to be disconnected from the fuel cell strip, identifying at least one fuel feed pipe portion connected to the fuel cell bundle, and identifying at least one fuel outlet pipe portion connected to the fuel cell bundle. A cutting blade is positioned on the fuel feed pipe portion and cutting through the fuel feed pipe portion, and similarly for the fuel outlet pipe portion. The fuel cell bundle is then removed, and a replacement inserted in its place.

5 Claims, 12 Drawing Sheets

(51) Int. Cl.
*H01M 8/2425* (2016.01)
*H01M 8/04089* (2016.01)
*H01M 8/12* (2016.01)
H01M 8/241 (2016.01)
H01M 8/124 (2016.01)

(52) U.S. Cl.
CPC ........ *H01M 8/2425* (2013.01); *H01M 8/2415* (2013.01); *H01M 2008/1293* (2013.01); *H01M 2300/0074* (2013.01)

(56) References Cited

FOREIGN PATENT DOCUMENTS

| | | |
|---|---|---|
| EP | 1603183 A1 | 12/2005 |
| EP | 1419547 B1 | 4/2008 |
| EP | 2221908 A1 | 8/2010 |
| EP | 2557624 A2 | 2/2013 |
| WO | 0217419 A2 | 2/2002 |

OTHER PUBLICATIONS

International Search Report and Written Opinion for corresponding PCT Application No. PCT/GB2015/053448, dated Jan. 21, 2016, 14 pgs.

* cited by examiner

METHOD AND COMPONENTS FOR REPAIRING A CERAMIC FUEL CELL STACK ASSEMBLY

CROSS REFERENCE TO RELATED APPLICATION

This application claims priority to GB Application No. 1420378.0, filed Nov. 17, 2014, which is incorporated by reference herein in its entirety.

There is disclosed a method and components for repairing a fuel cell stack. In particular, the method and components relate to repairing a high temperature fuel cell stack incorporating ceramic components.

BACKGROUND

Several different types of fuel cells comprise components made from ceramic materials, because ceramic materials are particularly robust during high temperature operation at and above 700° C. Ceramic materials are used in protonic ceramic fuel cells (PCFCs), molten carbonate fuel cells (MCFCs) and solid oxide fuel cells (SOFCs).

However, the primary disadvantage of current high temperature fuel cell technology is durability. The high temperatures at which these fuel cells operate accelerate component breakdown and corrosion, and therefore lead to decreasing fuel cell life.

SOFCs are solid-state devices which use an oxygen ion conducting ceramic electrolyte to produce electrical current by transferring oxygen ions from an oxidizing gas stream, such as air or oxidant, at the cathode of the fuel cell to a reducing gas stream, such as hydrogen, methane, natural gas, pentane, ethanol, or methanol, at the anode of the fuel cell. The SOFC, operating at a typical temperature between around 700° C. and around 1000° C., enable the transport of negatively charged oxygen ions from the cathode flow stream to the anode flow stream, where the ions combine with either free hydrogen or hydrogen in a hydrocarbon molecule to form water vapour and/or with carbon monoxide to form carbon dioxide. The excess electrons from the negatively charged ion are routed back to the cathode side of the fuel cell through an electrical circuit completed between the anode and the cathode, resulting in an electrical current flow through the circuit.

In order to increase the available power output of a fuel cell module, individual fuel cells are connected together in series to form a fuel cell bundle. Fuel cell bundles may be connected to adjacent fuel cell bundles to form a fuel cell strip. Fuel cell strips are connected together in parallel to form a fuel cell stack and multiple stacks may be connected together to form a module, to aggregate power output.

Fuel cells may be bundled together in the form of a plurality of planar elements, planar or cylindrical tubes, or other geometries. Fuel cell stacks, particularly those with planar geometry, often use seals between the electrolyte and the interconnecting surfaces to contain fuel and air at various locations within the fuel cell stack.

A typical fuel cell module may include a plurality of fuel cell stacks, the stacks may comprise a plurality of fuel cell strips connected in parallel, the fuel cell strips may comprise a number of fuel cell bundles and the bundles may comprise a number of fuel cell tubes or tube sub-assemblies.

Cracks in the ceramics used in the fuel cells or other components are a primary cause of failure of these devices. The thermal and mechanical loads imparted to the delicate fuel cells may lead to catastrophic failure of the fuel cells.

Currently, fuel cell stacks undergo detailed inspection process including electrical measurements as well as visual inspections to detect cracks as early as possible in the manufacturing process. However, cracks within the fuel cells and within fuel/oxidant manifolds are known to manifest during the lifetime of a fuel cell stack.

EP0668622B1 discloses a solid oxide fuel cell, which comprises a plurality of modules. Some of these modules comprise hollow members, which have two parallel flat surfaces upon which the solid oxide fuel cells are arranged. The opposite ends of each module are connected to reactant manifolds by compliant bellow connections.

EP1419547B1 discloses a solid oxide fuel cell stack, which comprises a plurality of modules, the modules comprising elongate hollow members, the hollow members having a passage for flow of reactant. The modules are arranged so that at least one end of each module is connected to an end of an adjacent module to allow reactant to flow sequentially through the modules in a serpentine type arrangement.

BRIEF SUMMARY

According to a first aspect, there is provided a method of repairing a fuel cell strip comprising:
identifying a fuel cell bundle within a fuel cell strip to be disconnected from the fuel cell strip;
identifying at least one fuel feed pipe portion connected to the fuel cell bundle;
identifying at least one fuel outlet pipe portion connected to the fuel cell bundle;
positioning a cutting blade on the at least one fuel feed pipe portion and cutting through the at least one fuel feed pipe portion to separate the at least one fuel feed pipe portion into a first fuel feed pipe portion connected to the fuel cell strip and a second fuel feed pipe portion connected to the fuel cell bundle, and positioning a cutting blade on the at least one fuel outlet pipe portion and cutting through the at least one fuel outlet pipe portion to separate the at least one fuel outlet pipe portion into a first fuel outlet pipe portion connected to the fuel cell strip and a second fuel outlet pipe portion connected to the fuel cell bundle;
removing the fuel cell bundle, the second fuel feed pipe portion, and the second fuel outlet pipe portion from the fuel cell strip;
inserting a replacement fuel cell bundle including a replacement second fuel feed pipe portion and a replacement second fuel outlet pipe portion; and
connecting the replacement fuel cell bundle to the fuel cell strip by:
    connecting the replacement second fuel feed pipe portion to the first fuel feed pipe portion with a sealing member; and
    connecting the replacement second fuel outlet pipe portion to the first fuel outlet pipe portion with a sealing member.

A benefit of the method is that defects detected during manufacture and inspection of the strip within a particular bundle can be replaced with relative ease enabling the fuel cell strip to be rectified. A further benefit of the method is that replacement of a defective section within a structural gas tight ceramic fuel cell assembly such as a fuel cell strip minimises the cost impact of a manufacturing defect or any defect detected during operation.

Optionally, the method further includes locating a feed pipe cutting guide on the at least one fuel feed pipe portion and locating a outlet pipe cutting guide on the at least one fuel outlet pipe portion, and positioning the cutting blade on the feed pipe cutting guide on the at least one fuel feed pipe portion and on the outlet pipe cutting guide on the at least one fuel outlet pipe portion.

According to a second aspect, there is provided a solid oxide fuel cell stack comprising at least one fuel cell strip, the at least one strip comprising:

a fuel feed pipe comprising a plurality of fuel feed pipe portions;

a fuel outlet pipe comprising a plurality of fuel outlet pipe portions; and a plurality of bundles, each bundle comprising a plurality of tube sub-assemblies, the tube sub-assemblies comprising fuel cell tubes separated longitudinally by end fittings connecting adjacent tube sub-assemblies, the end fittings providing a passage for fuel;

wherein one of a respective lowermost or uppermost tube sub-assembly of each bundle comprises a manifold end fitting connecting the bundle to the fuel feed pipe portion and the other of the respective lowermost or uppermost tube sub-assembly of each bundle comprises a manifold end fitting connecting the bundle to the fuel outlet pipe portion; and wherein at least one of the fuel feed pipe portion and at least one of the fuel outlet pipe portion comprise a cutting guide configured to indicate a location for safe cutting of the at least one of the fuel feed pipe portions and at least one of the fuel outlet pipe portions.

The cutting guide indicates the position at which a cutting blade may be positioned on the fuel feed pipe portion in order to safely cut through the fuel feed pipe portion without damaging other parts of the fuel cell strip. The cutting guide may be a line or mark, or it may be a groove in the pipe portion. The ability to safely remove a bundle from a strip vastly reduces the manufacturing and running costs of a fuel cell. Over the lifetime of a fuel cell, certain fuel cell bundles may experience adverse degradation or may even experience complete failure. Consequently, surrounding bundles compensate for the reduction in efficiency of the degraded bundle and the overall strip life span is reduced. Current methods only allow removal of an entire strip. However, this is wasteful since a large proportion of the strip may be in good working order.

Optionally, the cutting guide is a notch configured to constrain a cutting blade positioned in the notch, to reduce movement of the cutting blade relative to the fuel feed pipe portion and/or the fuel outlet pipe portion.

Optionally, the cutting guide is a line formed on a surface of the at least one of the fuel feed pipe portion and at least one of the fuel outlet pipe portion.

Optionally, the fuel feed pipe portions and the fuel outlet pipe portions may be made from an impervious material such as a magnesia magnesium aluminate (MMA) ceramic material. The benefit of using MMA is that the pipe portions may be manufactured using techniques such as injection moulding or press moulding which provide very accurate structures and therefore provide very accurate tolerance of the cutting guide.

BRIEF DESCRIPTION OF THE DRAWINGS

Embodiments of the invention are further described hereinafter with reference to the accompanying drawings, in which.

DETAILED DESCRIPTION

Figure 1:
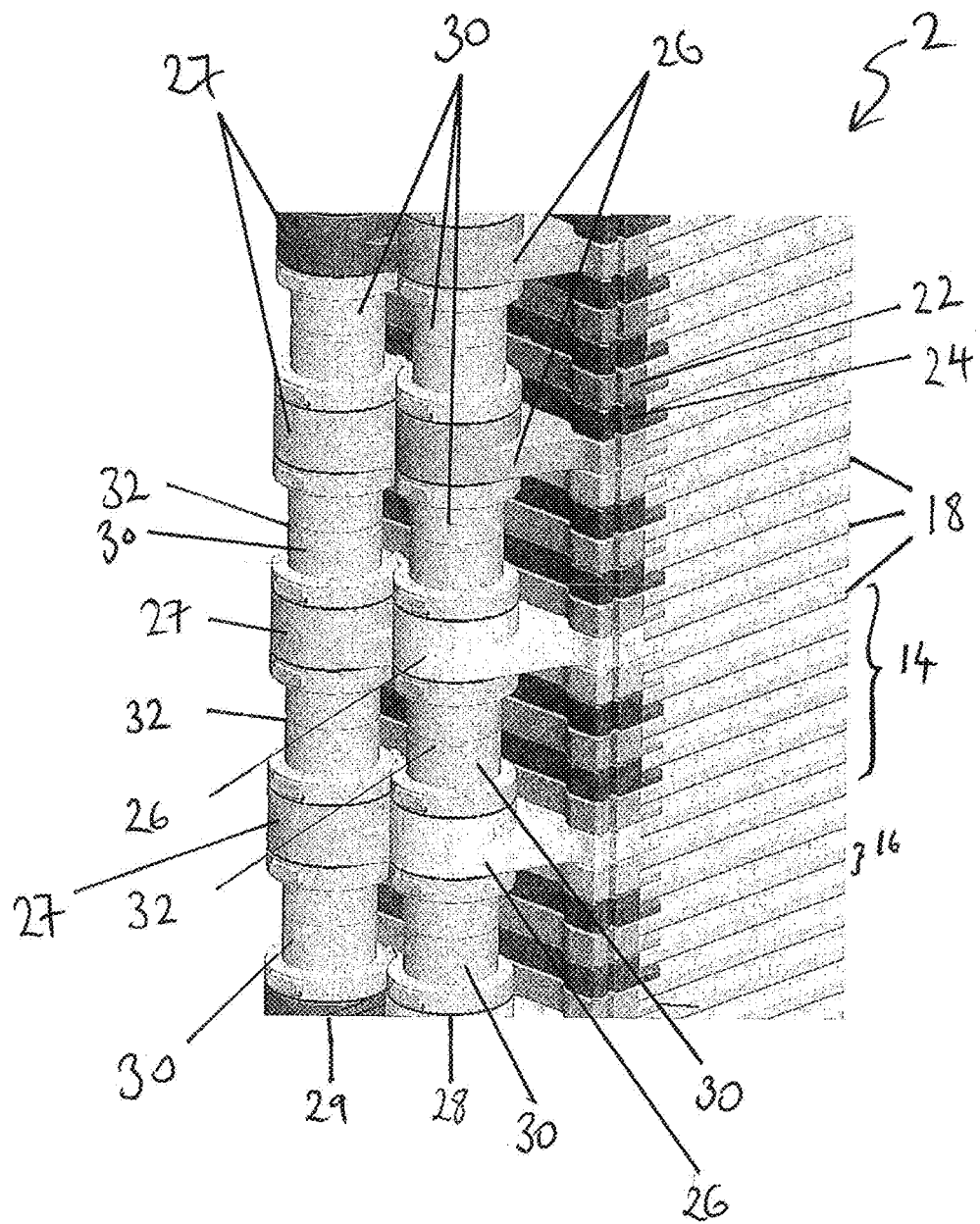
FIG. 1 shows a portion of a solid oxide fuel cell strip.

In the described embodiments, like features have been identified with like numerals, albeit in some cases having increments of integer multiples of 100.

A fuel cell stack is made up of a plurality of fuel cell strips 2. The fuel cell strips 2 are made up of a plurality of fuel cell bundles 14 and a fuel cell bundle 14 comprises a plurality of fuel cell tube sub-assemblies 16 having a fuel cell tube 18 between end fittings 22, 24. Fuel cells comprise an anode electrode, an electrolyte and a cathode electrode. A reactant, e.g. fuel, stream is supplied to the anode electrodes and an oxidant stream, e.g. air, is supplied to the cathode electrodes. The fuel cells are arranged on two parallel surfaces of an elongate hollow member i.e. a fuel cell tube sub-assembly. The anode electrodes are arranged on the surfaces of the fuel cell tube assemblies and the cathode electrodes are spaced from the surfaces of the fuel cell tubes by the anode electrodes and the electrolytes. The fuel cell tubes are porous so that fuel is able to flow to the fuel cells. The fuel cells are spaced apart along the fuel cell tube and are electrically connected in series. Fuel flows sequentially through the fuel cell tube sub-assemblies from a fuel inlet manifold to fuel outlet manifold. Additionally, air or oxidant flows through the space between adjacent fuel cell tubes. Each fuel cell bundle typically comprises six fuel cell tube sub-assemblies and each bundle typically has 720 fuel cells in series. Each strip typically has six pairs of bundles electrically connected in parallel. In a preferred embodiment, a fuel cell stack is formed from five fuel cell strips connected together in parallel. Fuel and oxidant are regulated at strip level, while the temperature is regulated at stack level.

Fuel cell tubes 18 are arranged substantially parallel to each other in a plane. Adjacent tube sub-assemblies 16 are also arranged substantially parallel to one another and spaced apart such that the fuel cell tube 18 of one fuel cell tube sub-assembly 16 does not touch the fuel cell tube 18 of an adjacent tube sub-assembly 16.

The tube sub-assembly 16 is connected to an adjacent tube sub-assembly via an end fitting 22, 24. The benefits of using end fittings in combination with a fuel cell tube to make a tube sub-assembly 16 are numerous and include minimising the number of parts required when constructing the fuel cell strip 2. As such, the tube sub-assembly 16 is a single part. Constructing the stack in a modular manner reduces the need for complex fuel cell tube sealing procedures, and allows for the individual fuel cell tube sub-assemblies to be tested for integrity prior to installation in a bundle or more complete structure. The fuel cell tube 18 is arranged in the end fittings 22, 24 and the fuel cell tube 18 is sealed using a bond to create a sealed unit, the end fitting forming a gas tight fuel flow path between the fuel cell tube and the end fitting.

The end fittings 22, 24 provide mechanical tolerance between adjacent fuel cell tubes, adjacent tube subassemblies and adjacent bundles. The end fittings therefore provide a mechanical and thermal path for stresses and strains to propagate and mitigate stresses and strains propagating through the more fragile fuel cell tubes.

Fuel manifold end fittings 26, 27 are required to terminate the uppermost tube sub-assembly and the lowermost tube sub-assembly of the bundle 14 and the manifold end fittings 26, 27 connect each bundle 14 to the fuel pipe portions 30 of the main strip fuel feed and outlet pipes 28, 29. The fuel manifold end fittings are described in more detail below. Fuel flows through the fuel feed pipes 28 into and through the manifold end fitting 26 and into the tube sub-assemblies 18. The fuel flows out of the tube sub-assemblies 16 through the manifold end fittings 27 and into and through the fuel outlet pipes 29. The tube sub-assemblies 16 are arranged such that fuel flows sequentially through adjacent tube sub-assemblies 16 in a serpentine arrangement from a fuel manifold end fitting 26 at the fuel feed pipe 28 to the associated fuel manifold end fitting 27 at the fuel outlet pipe 29.

The end fittings are manufactured from a material having a coefficient of thermal expansion (CTE) matched to the CTE of the solid oxide fuel cell tubes. Solid oxide fuel cells require operating temperatures of around 750 to 1100° C. to maintain low internal electrical resistances. Large temperature variations across the fuel cell stack from cold start-up for example, can cause large expansion and contraction of components and a mismatch in the CTE can have catastrophic consequences for the mechanical and thermal integrity of the solid oxide fuel cell strip 2. Temperature variances are found throughout the fuel cell stack and throughout the tube sub-assemblies even at normal operating temperatures. Therefore, by matching the CTE of the end fittings with the CTE of the fuel cell tubes, mechanical stresses induced by thermal variation of the fuel cell tubes and end fittings are reduced.

The end fittings are made from an impervious material such as a magnesia magnesium aluminate (MMA) ceramic material. Materials that are impervious, capable of withstanding the operating temperatures of the fuel cell stack and with a coefficient of thermal expansion matched to the CTE of the fuel cell tubes are suitable for producing the end fittings. Furthermore, the impervious end fittings are able to bear larger compressional loads when compared with the more delicate fuel cell tubes.

The end fittings may be produced via an injection moulding process. Injection moulding is a widely utilised manufacturing process for producing parts using precision-machined moulds to form geometrically accurate parts. Alternatively, the end fittings may also be produced using press moulding. Press moulding or a pressing process provides similarly geometrically accurate parts as required by embodiments of the present invention.

The first type end fitting 22 and the second type end fitting 24 adjoin adjacent tube sub-assemblies 16 to provide a gas tight channel between the adjacent tube sub-assemblies 16 and to allow reactant to flow sequentially through the tube sub-assemblies 16. Since the fuel cell tubes 18 of adjacent tube sub-assemblies 16 do not touch, mechanical stresses and thermal stresses are not compounded within the fuel cell tubes 18, but instead thermal and mechanical stresses propagate through the end fittings 22, 24. The end fittings 22, 24 are designed to withstand the thermal and mechanical stresses as they are more robust that the fuel cell tubes 18. Therefore, mechanical and thermal stresses do not build up in the fuel cell tubes of the bundles. In this arrangement, thermal and mechanical stresses in the solid oxide fuel cell strip 2 are reduced.

Furthermore, using end fittings as part of the tube sub-assemblies 16 enables the tube sub-assemblies 16 to be manufactured without requiring subsequent sealing processes. The tube sub-assemblies 16 may be inspected for joint leakage, geometrical accuracy, and pressure drop through the tube sub-assembly prior to installation of the tube sub-assembly within a bundle. Mechanical and thermal stresses are reduced in the overall fuel cell stack in part due to improving manufacturing tolerances in the tube sub-assembly 16.

Manufacturing the tube sub-assemblies 16 in isolation from the manufacture of the bundles 14 or the solid oxide fuel cell strip 2 provides an opportunity to address defects within the fuel cell tubes 18, since the tube sub-assembly 16 can be tested for leaks prior to installation in the more complete fuel cell stack.

In certain embodiments, the end fittings have a single or several internal fuel flow channels for flow of reactant.

Figure 2:
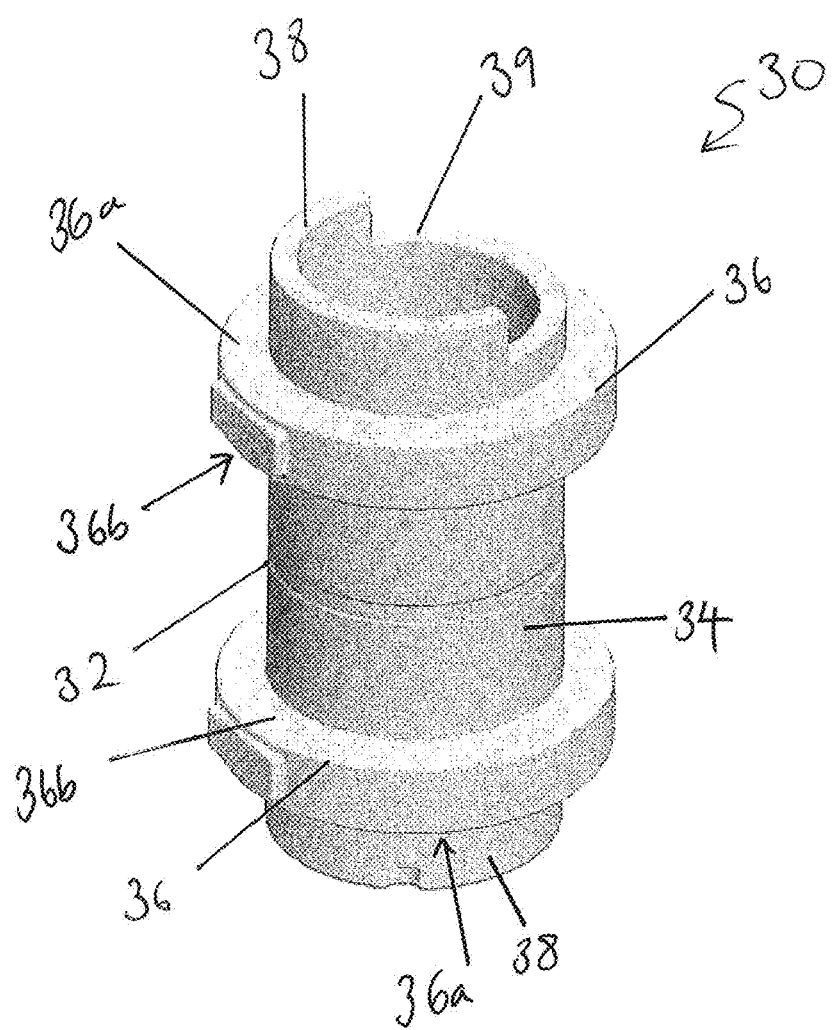
FIG. 2 shows a portion of a fuel pipe.
Figure 3:
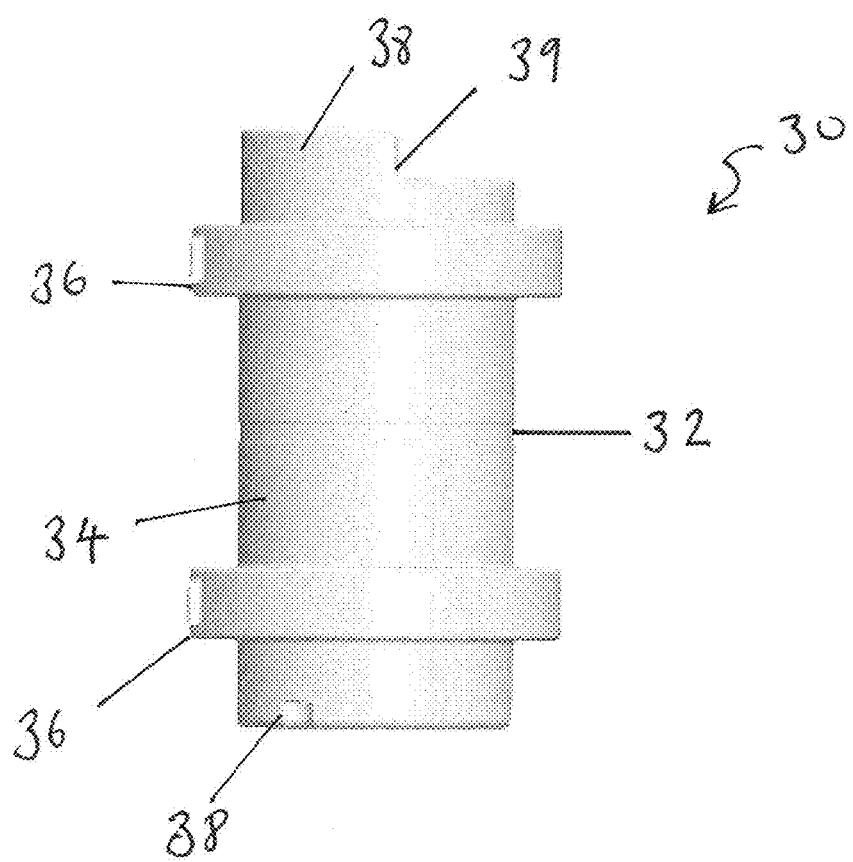
FIG. 3 shows a portion of a fuel pipe.

FIGS. 2 and 3 show the fuel pipe portion 30 isolated from the fuel cell strip 2. Other variants of the pipe geometry are also envisaged with similar functionality such as oval, elliptical or race track in cross-section for example. The fuel pipe portion 30 in conjunction with the manifold end fittings 26, 27 of the fuel cell bundles 14 form the main strip fuel pipes 28, 29. The fuel pipe portion 30 has a cutting guide 32 shown as a groove moulded into the body 34 of the fuel pipe portion 30. The cutting guide indicates the position of the incision required to separate the bundle from the strip. The shape of the fuel pipe 30 does not need to be round as shown, and the fuel pipe portion could be provided in other shapes, such as oval or rectangular. The fuel pipe portions 30 must be configured to couple with the manifold end fittings 26 or 27 of adjacent fuel cell bundles 16 to provide a passage for fuel between the manifold end fittings 26 or 27.

The fuel pipe portion 30 is also provided with flanges 36 and inserts 38. The inserts are configured to cooperate with the manifold end fittings 26, 27 and are inserted into the manifold end fittings 26, 27. The flanges provide a sealing surface and using a tape cast gasket or ceramic glass paste, a gas tight passageway for fuel is formed.

In certain embodiments, the insert 38 may also have a cut away 39. The cut away allows for easier insertion of the fuel pipe 30 into the fuel cell strip 2 and allow fuel to exit the pipe 30 into the bundle fuel manifold end fittings 26 or 27.

Figure 4:
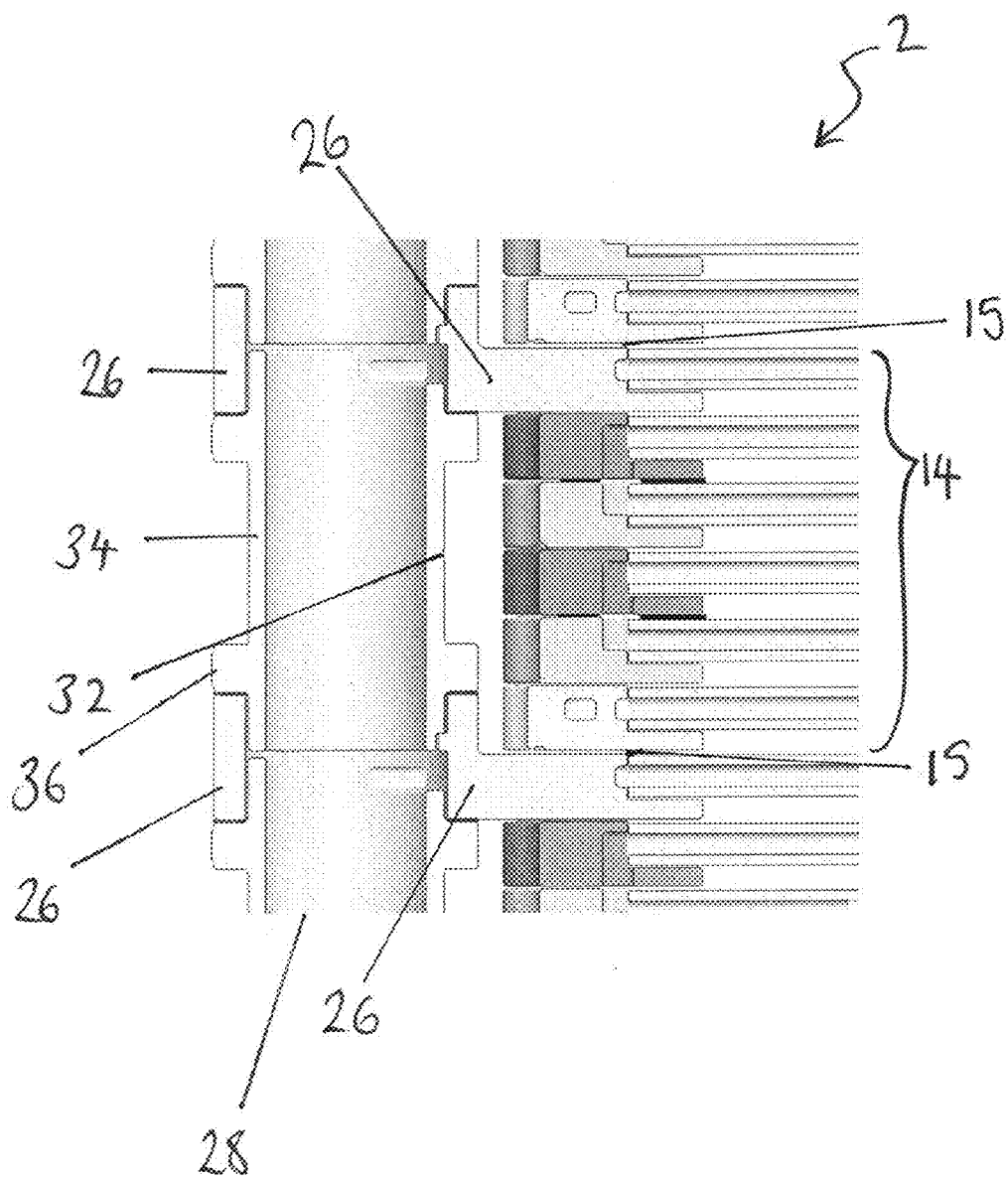
FIG. 4 shows a portion of a bundle of a solid oxide fuel cell strip.

FIG. 4 shows a cross-section view of a section of the fuel cell strip 2. Cutting through the fuel pipe 30 at the cutting guide 32 on adjacent fuel pipes 30 enables the safe removal of a specific bundle. Using the remaining fuel pipe portions, a replacement bundle may be positioned in the fuel cell strip 2 and the fuel pipes resealed to form gas tight flow passages for the flow of fuel.

Expansion gaps 15 between end pipe fittings 26 or 27 and end fittings 22 or 24 reduce mechanical and thermal stresses from propagating through adjacent bundles 14. The presence of expansion gaps between bundles enables the removal of a specific bundle within the strip because the bundles are connected within the strip by way of their respective connection to the fuel pipe via the manifold end fittings. Therefore, the bundle is fixed within the strip by means of the connection to the fuel pipes 28, 29.

To remove a defective bundle 14 from the fuel cell strip 2, four fuel pipes 30 must be cut at the location of the cutting guide 32 in order to remove an interior bundle 14 from the fuel cell strip 2. This is because the strip has a fuel feed pipe 28 and a fuel outlet pipe 29 and both of these fuel pipes 28, 29 must be cut above and below a specific bundle to remove the bundle. If a bundle at the top or at the bottom of the strip is defective, only two fuel pipes 30 must be cut as the connections at the top and the bottom of the strip may already be removeable.

Figure 5:
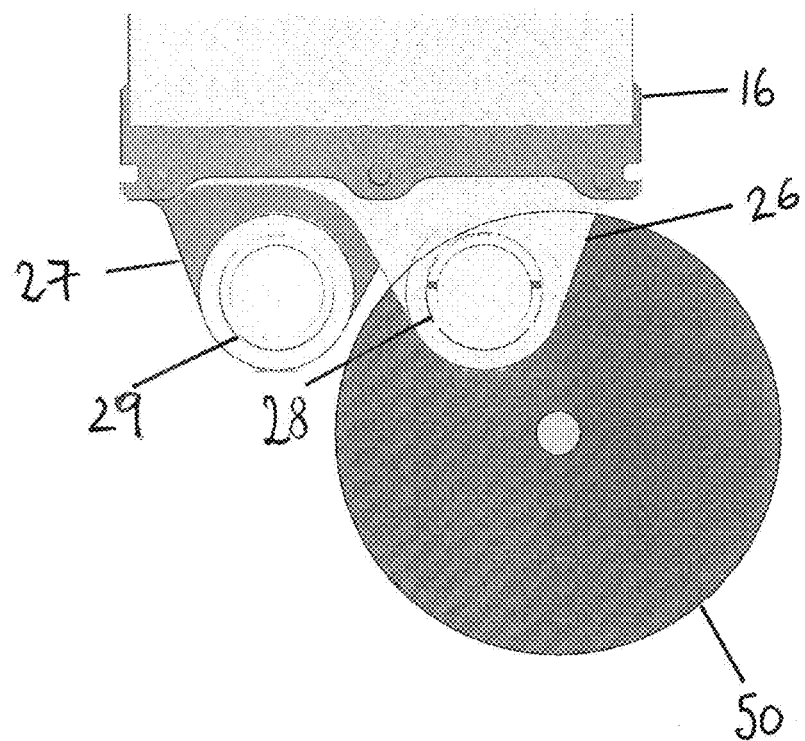
FIG. 5 shows a cutting tool and a portion of the solid oxide fuel cell strip.

FIG. 5 shows the cutting tool 50 used to cut through the fuel feed pipe 28. The fuel feed pipe 28 and cutting tool or jig with cutting wheel 50 are configured to so that the cutting tool can cut through the four fuel pies 30 of the fuel pipes 28, 29 without cutting through the fuel cell tube sub-assemblies 16 or any other part of fuel cell strip 2.

The cutting tool 50 is a type of circular saw. The circular saw enables the cut to access the fuel pipe while reducing the chance of damaging the surrounding strip components.

In some embodiments, a pressure sensor is provided on the cutting tool so that the cutting tool automatically stops once the cutting tool cuts through the fuel pipe.

Figure 6:
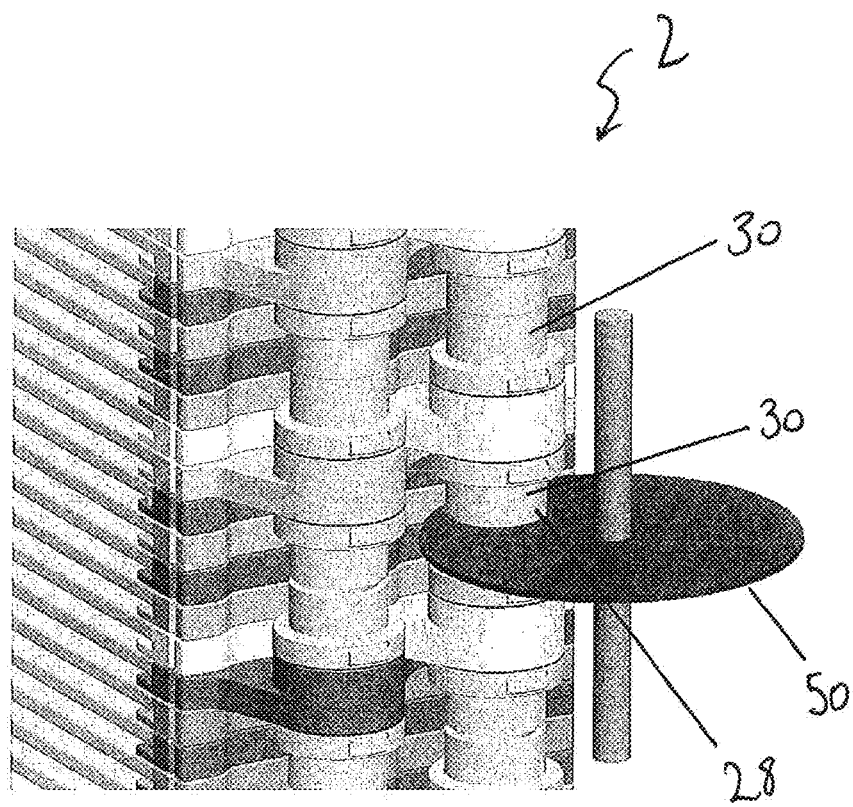
FIG. 6 shows a perspective view of a cutting tool cutting through a portion of a fuel pipe in a fuel cell strip.

FIG. 6 shows an alternative view of the cutting tool 50 cutting through the fuel pipe 30 of the fuel feed pipe 28 at the location of the cutting guide 32. Sufficient clearance between the fuel pipes connected to the bundle manifold end fittings and between adjacent fuel pipes is required to reduce the risk of damage by the cutting tool 50 to the surrounding components.

Figure 7:
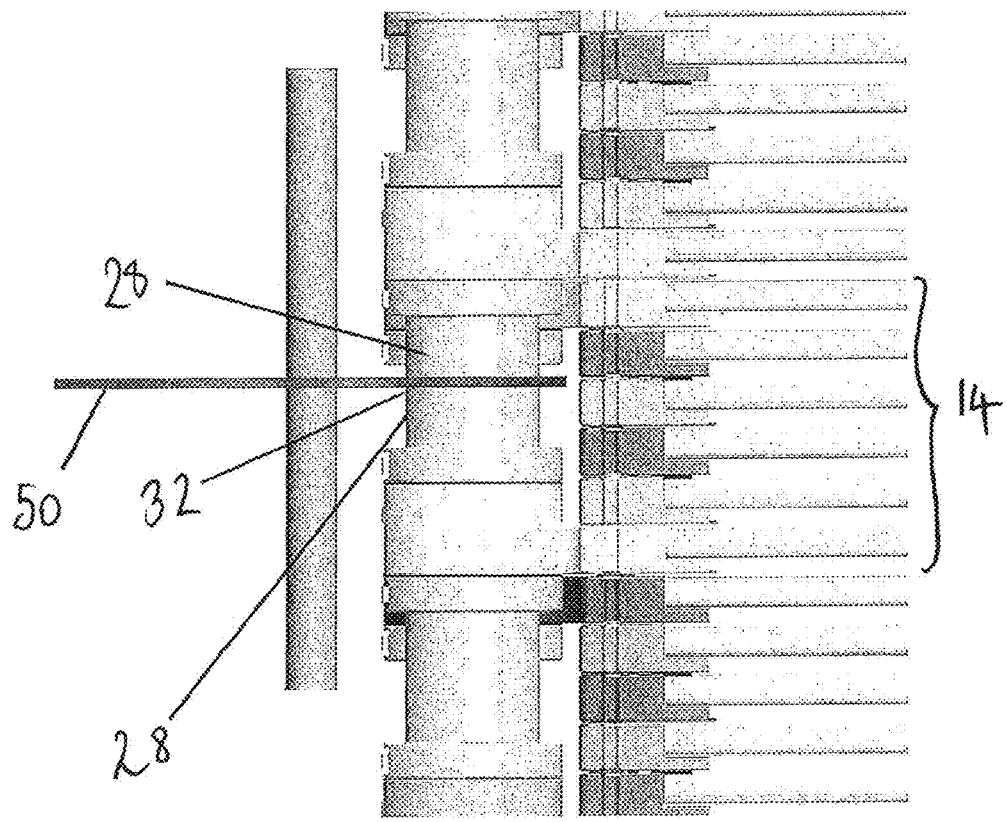
FIG. 7 shows a cutting tool and a portion of the solid oxide fuel cell strip.

FIG. 7 shows a cross-section view of a section of the strip with the cutting tool cutting through the fuel pipe 30 of the fuel feed pipe 28. The figure shows good clearance between the blade of the cutting tool and the nearest end fitting 26 of the fuel cell strip 2.

Figure 8:
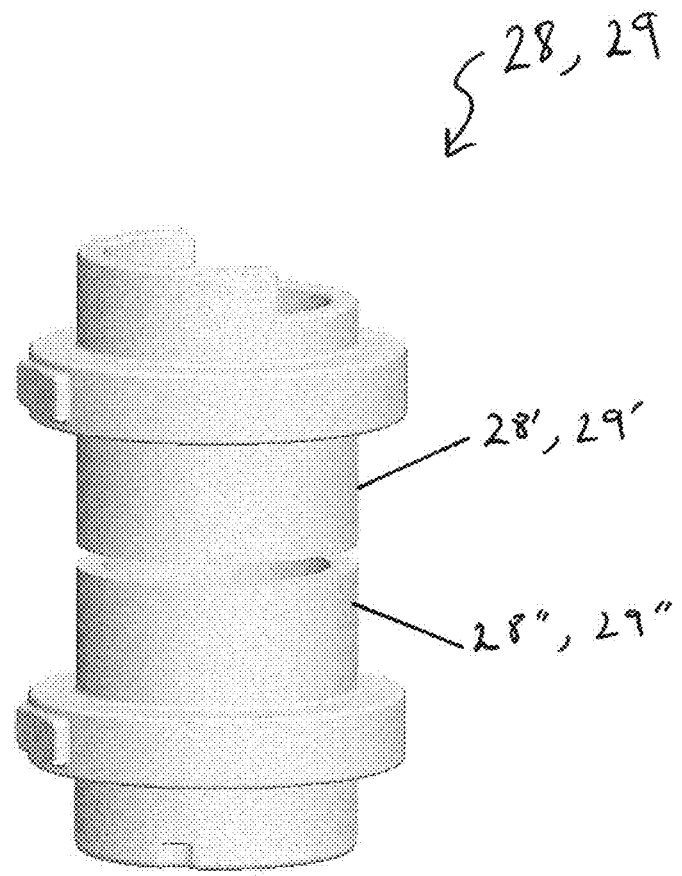
FIG. 8 shows portions of a fuel pipe after cutting.
Figure 9:
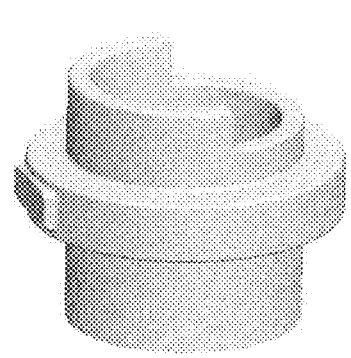
FIG. 9 shows the portions of a fuel pipe after cutting and a collar.
Figure 9:
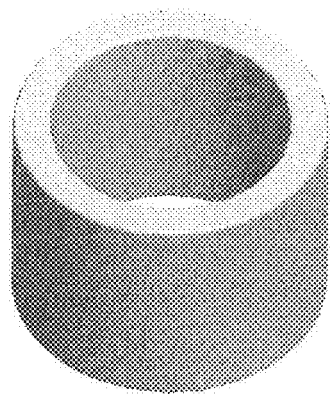
Figure 9:
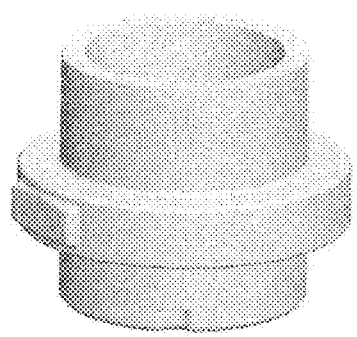

FIGS. 8 and 9 show sections of the cut fuel pipe 30 having segments 28', 29' and 28", 29". An additional collar 31 is configured to create a replacement joint and is required to reseal the fuel pipe once the bundle has been replaced. The new bundle is secured into the strip using tape cast glass ceramic gaskets as originally used for the strip assembly.

It is to be noted that the flanges 36 of the fuel pipe portion 30 have annular surfaces 36a facing away from the middle of the fuel pipe portion 30 and have annular surfaces 36b facing each other and the middle of the fuel pipe portion 30. The annular surfaces 36a are provided with glass ceramic gaskets 33 to seal against the end pipe fittings 26 or 27 during the initial building of the fuel cell strip 2. The annular surfaces 36b are provided with glass ceramic gaskets 33 to seal against the annular end surfaces of the collar 31 during a replacement of a bundle 14'. Thus, the glass ceramic gaskets 33 seal against the annular surfaces 36b on the flanges 26 of the segments 28' 29' and 28" and 29" of the fuel feed pipe 28 and the fuel outlet pipe 29.

Figure 10:
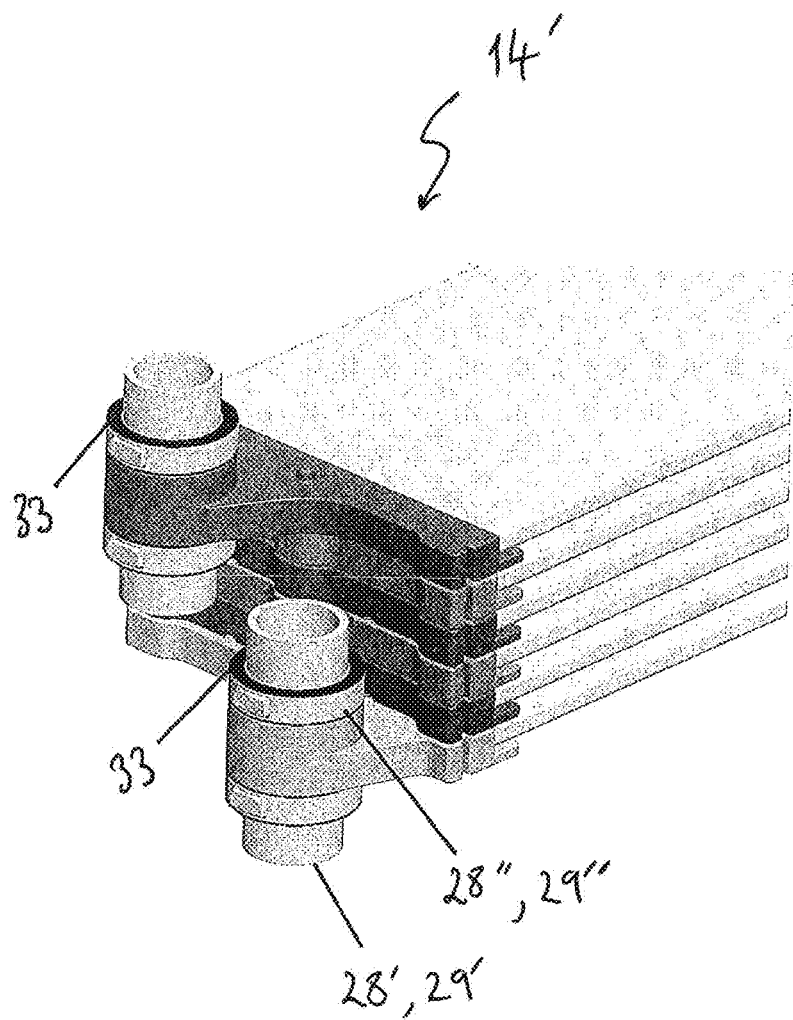
FIG. 10 shows a perspective view of a replacement bundle prior to insertion into the strip.

FIG. 10 shows a replacement bundle 14' prior to installation into the strip 2. Before the bundle can be replaced, the replacement fuel pipe segments 28', 29' and 28", 29" must be fitted with new tape cast glass ceramic gaskets 33.

The replacement bundle is either a repaired bundle or alternatively a new bundle, and the replacement bundle is positioned in the strip to replace the defective bundle. The collar 31 provides a replacement joining means for joining the new bundle to the stack. The collar 31 is secured using tape cast glass ceramic gaskets 33. Replacing a bundle requires the fuel pipes to be cut in four positions and therefore each cut fuel pipe 30 requires a replacement collar 31 in order for the replacement bundle 14' to be inserted into the fuel cell strips and secured so that the fuel pipes 28 and 29 are gas-tight.

Figure 11:
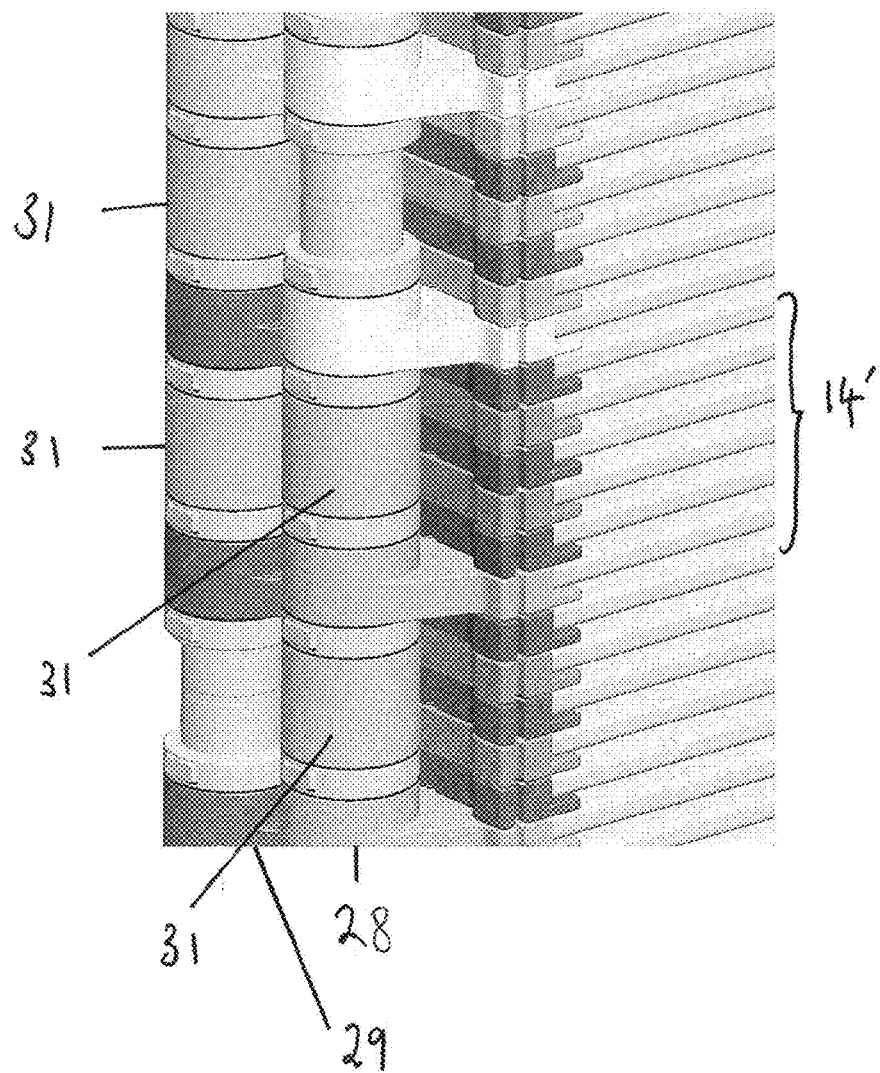
FIG. 11 shows a perspective view of a replacement bundle in a solid oxide fuel cell strip.

FIG. 11 shows a section of a fuel cell strip 2 with a replacement bundle 14' and four collars 31 above and below the replacement bundle 14' securing and sealing the bundle 14' to the fuel pipes 28, 29.

Figure 12:
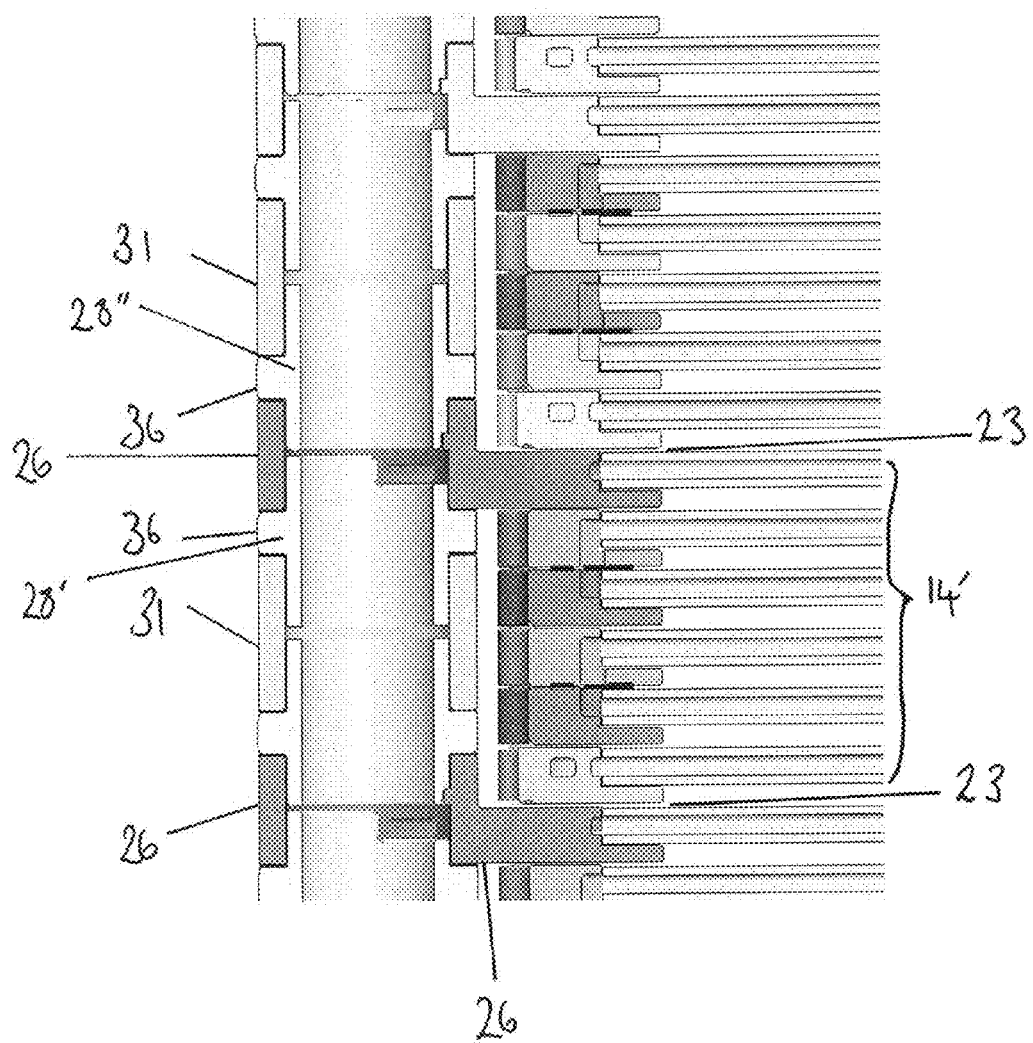
FIG. 12 shows a portion view through a replacement bundle in a solid oxide fuel cell strip.

FIG. 12 shows a cross-sectional view of a section of the fuel cell strip 2 with the bundle 14' replaced. The collar 31 is positioned around the two segments 28', 29', 28", 29" of the fuel pipes 28, 29. Expansion gaps 23, as mentioned previously, between adjacent bundles allow the bundle 14' to be easily replaced since the bundles are only secured within the fuel cell strip 2 via their respective connections to the fuel pipes 28, 29 via the fuel manifold end fittings 26, 27.

Although the use of a cutting guide is preferred in order to cut the fuel pipe portion, it is equally possible that the fuel pipe portion does not have a cutting guide. In addition, although it is preferred that the fuel pipe portion is cut in the middle of the fuel pipe portion it may be cut at any suitable position along its length as long as there is sufficient length of the remaining pipe portion available to locate and bond onto the collar.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of repairing a fuel cell strip comprising:
   identifying a fuel cell bundle within a fuel cell strip to be disconnected from the fuel cell strip;
   identifying at least one fuel feed pipe portion connected to the fuel cell bundle;

identifying at least one fuel outlet pipe portion connected to the fuel cell bundle;

positioning a cutting blade on the at least one fuel feed pipe portion and cutting through the at least one fuel feed pipe portion to separate the at least one fuel feed pipe portion into a first fuel feed pipe portion connected to the fuel cell strip and a second fuel feed pipe portion connected to the fuel cell bundle, and positioning a cutting blade on the at least one fuel outlet pipe portion and cutting through the at least one fuel outlet pipe portion to separate the at least one fuel outlet pipe portion into a first fuel outlet pipe portion connected to the fuel cell strip and a second fuel outlet pipe portion connected to the fuel cell bundle;

removing the fuel cell bundle, the second fuel feed pipe portion, and the second fuel outlet pipe portion from the fuel cell strip;

inserting a replacement fuel cell bundle including a replacement second fuel feed pipe portion and a replacement second fuel outlet pipe portion; and connecting the replacement fuel cell bundle to the fuel cell strip by:

connecting the replacement second fuel feed pipe portion to the first fuel feed pipe portion with a sealing member; and connecting the replacement second fuel outlet pipe portion to the first fuel outlet pipe portion with a sealing member.

2. The method according to claim 1, wherein the method further includes locating a feed pipe cutting guide on the at least one fuel feed pipe portion and locating a outlet pipe cutting guide on the at least one fuel outlet pipe portion, and positioning the cutting blade on the feed pipe cutting guide on the at least one fuel feed pipe portion and on the outlet pipe cutting guide on the at least one fuel outlet pipe portion.

3. A solid oxide fuel cell stack comprising at least one fuel cell strip, each strip comprising:

a fuel feed pipe comprising a plurality of fuel feed pipe portions;

a fuel outlet pipe comprising a plurality of fuel outlet pipe portions; and a plurality of bundles, each bundle comprising a plurality of tube sub-assemblies, the tube sub-assemblies comprising fuel cell tubes separated longitudinally by end fittings connecting adjacent tube sub-assemblies, the end fittings providing a passage for fuel;

wherein one of a respective lowermost or uppermost tube sub-assembly of each bundle comprises a manifold end fitting connecting the bundle to the fuel feed pipe portion and the other of the respective lowermost or uppermost tube sub-assembly of each bundle comprises a manifold end fitting connecting the bundle to the fuel outlet pipe portion; and wherein at least one of the fuel feed pipe portion and at least one of the fuel outlet pipe portion comprise a cutting guide configured to indicate a location for safe cutting of the at least one of the fuel feed pipe portions and at least one of the fuel outlet pipe portions.

4. The solid oxide fuel cell stack according to claim 3, wherein the cutting guide is a notch configured to constrain a cutting blade positioned in the notch, to reduce movement of the cutting blade relative to the fuel feed pipe portion and/or the fuel outlet pipe portion.

5. The solid oxide fuel cell stack according to claim 3, wherein the cutting guide is a line formed on a surface of the at least one of the fuel feed pipe portion and at least one of the fuel outlet pipe portion.

\* \* \* \* \*